United States Patent [19]

Chalansonnet

[11] 4,189,816
[45] Feb. 26, 1980

[54] COMPOSITE BEARING RACE AND METHOD FOR ITS FABRICATION

[75] Inventor: M. Roger Chalansonnet, Annecy, France

[73] Assignee: Societe Nouvelle de Roulements, Annecy, France

[21] Appl. No.: 842,803

[22] Filed: Oct. 17, 1977

[30] Foreign Application Priority Data

Oct. 26, 1976 [FR] France .............................. 76 32199

[51] Int. Cl.² .............................................. B21K 1/04
[52] U.S. Cl. .............................................. 29/148.4 C
[58] Field of Search .................... 29/148.4 C, 148.4 R

[56] References Cited

U.S. PATENT DOCUMENTS 3,626,564  12/1971  Daniel .............................. 29/148.4 R

FOREIGN PATENT DOCUMENTS

| 1938165 | 3/1971 | Fed. Rep. of Germany .......... 29/148.4 |
| 677922 | 12/1929 | France . |
| 1333133 | 6/1963 | France . |
| 1600856 | 8/1970 | France . |
| 2078392 | 10/1971 | France . |
| 2142408 | 1/1973 | France . |
| 2195490 | 3/1974 | France . |
| 2268983 | 11/1975 | France . |

Primary Examiner—Francis S. Husar
Assistant Examiner—V. K. Rising
Attorney, Agent, or Firm—Oblon, Fisher, Spivak, McClelland & Maier

[57] ABSTRACT

A composite bearing race and method for fabrication of such race, the composite bearing race consisting of an assembly of two concentric rings in which the ball grooves are impressed by rolling and which is subjected to a heat treatment. The method of fabricating the composite bearing race includes deformably assembling two concentric rings by rolling to radially embed a ball groove of one ring into the other and subject the composite bearing race formed to heat treatment.

8 Claims, 8 Drawing Figures

COMPOSITE BEARING RACE AND METHOD FOR ITS FABRICATION

BACKGROUND OF THE INVENTION

1. Field of the Invention

The invention concerns composite bearing races, the material of the body of the race differing from that forming the ball groove.

2. Description of the Prior Art

Bearings are known in which at least one of the races consists of two continuous metal rings concentric with one another and one shrunk on the other. These rings may be of different alloys heat treated in different ways to confer mechanical properties to them corresponding to their functions. Thus a ring with a ball groove would have a high degree of hardness, while an outer ring would have a lower degree of hardness to facilitate machining.

The problem left unsolved by this type of bearing resides in the fact that the axial immobilization of the ring with the ball groove cannot be guaranteed with sufficient precision when the balls, disposed between the races, are subjected to simultaneous axial and radial forces. To remedy this defect, it has been attempted to make ball bearing races in the form of a ring into which is screwed a race, the periphery of which constitutes a ball groove. This race does not allow the use of conventional materials, satisfactorily hardened by appropriate heat treatment. It is known, in fact, that the heat treatment envisaged (tempering, case hardening) always superficially deforms the threaded race so that correct fitting of it in the ring proves to be difficult, if not impossible. This is due to the fact that the steels making up the races no longer have, after their heat treatment, the characteristics of resilience and tenacity necessary for mechanical strength of the threads.

SUMMARY OF THE INVENTION

An object of the race conforming to the present invention is to permit satisfaction of the different mechanical performance requirements of ball groove surfaces and the surfaces for mounting a race to peripheral devices.

The invention, further, has as its object the realization of a tempered bearing race which can be fashioned by machining techniques suitable for soft or annealed steels.

In conformance with the present invention, the bearing race is characterized by the radial deformation of a set of two concentric rings to the point of filling a space or cavity conforming to the dimensions of the bearing race to assure axial retention of the rings and subjecting the race to a heat treatment favoring the shrinking of one ring on the other and their radial cohesion.

The race thus realized is obtained by the concentric assemblage of two coaxial cylindrical rings made of metals of different types in the annealed state. In the case of an outer race of a bearing, the inner ring with ball grooves will be of steel of type 100 c6 or the like, specifically for bearings. The outer ring with the mounting holes, threaded or not, will be of low-carbon steel. The two assembled rings are rolled and assume the form of an assembly of dimensional characteristics corresponding to those of the specified bearing race.

The assembly is then subjected to a heat treatment prescribed for bearing steels. During this treatment, in the phase transformation austenite-martensite, the dimensional modification of the inner ring manifests itself by an increase in volume and favors tight contact between the rings. The rings will consequently be immobilized in rotation and the shape of the profile generated by rolling the inner surface of the ring prevents any relative displacement in the axial direction.

Another mode of fabrication according to the present invention consists of raising temperature of the assembly of two rings to above 850° C. and rolling them at this temperature, as well as rapidly cooling the outer ring in the course of this operation.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
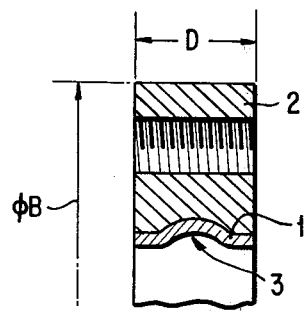
FIG. 1 is a cross-section of an outer bearing race formed with one row of balls.
Figure 2:
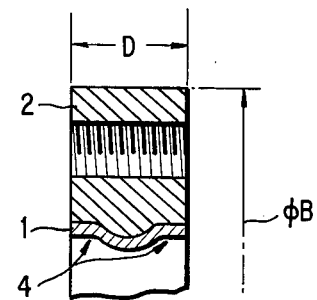
FIG. 2 is a cross-section of an outer bearing race formed with two rows of balls.
Figure 8:
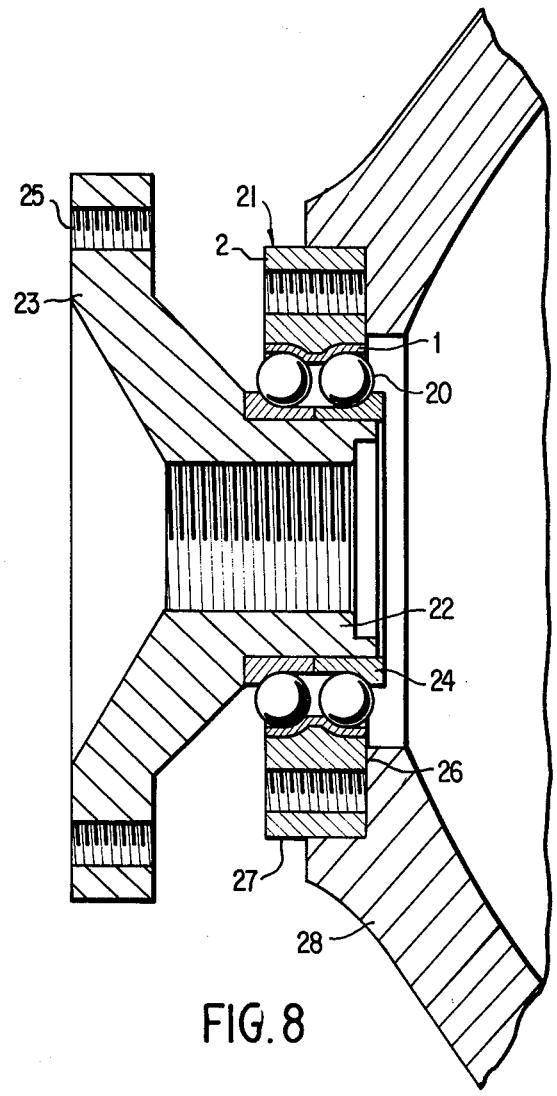
FIG. 8 is a longitudinal section of an assembled bearing using the race of the invention.

As is shown in FIGS. 1, 2 and 8, the bearing race of the present invention includes two distinct rings 1 and 2. The ring 1 has one groove 3 (FIG. 1) or two grooves 4 (FIG. 2) for the rolling elements such as balls 20 (FIG. 8).

The ring 1 is composed of steel alloyed with chromium of a type corresponding in general essentially to the alloy 100 c6 according to the French norm AFNOR NF A 35551 or 52100 according to the U.S. norm SAE J 404 F, i.e. of composition within the limits given below in percent (by weight): C 0.95 to 1.10—Cr 1.50 to 1.60—Ni≦0.30—Mn 0.25 to 0.40—Si 0.10 to 0.35—P+S≦0.025—remainder: Fe. The ring 2 is a corrosion resistant alloy such as a steel with a low percentage of carbon. For example, what has become popular in free machining is the use of resulfurized or leaded carbon steels with carbon content of up to 0.40% in weight and such is preferred for the outer ring of the present invention. As known, as the steel is heated to austenitizing, austenite forms and cementite dissolves. On cooling, the austenite may transform to martensite or bainite, depending on the rate of cooling, and on the hardenability of the steel. The formation of martensite from austenite results in an expansion with the magnitude of the expansion increasing with the carbon content. The formation of bainite from austenite results in an expansion less than the expansions of the austenite-martensite transformation. Said heat treating of the rolled assembly results in a larger expansion of the inner ring member than the outer ring member because of a higher carbon content in the martensite of the inner ring member than in the martensite of the outer ring member. One more reason is that the austenite of the outer ring member may transform to bainite during cooling because of the light carbon content, thus increasing the contractive effect between the inner ring member and the outer ring member. A similar effect may be obtained on carburizing steel during the quenching step after carburization.

Figure 3:
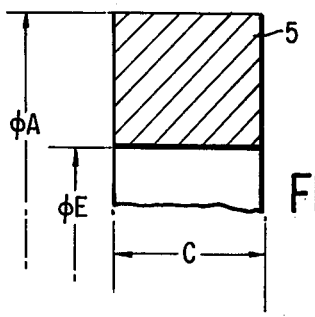
FIGS. 3 and 4 are cross-sections of the inner and outer rings of the race before their assembly by rolling.

The method of fabricating the bearing race is as follows: the outer ring 2 is realized starting from a blank 5 (FIG. 3) by a known technique using the operations of turning or punching. The outer diameter A and the width C of the blank 5 are slightly less than the outer diameter B and the width D of the ring 2, respectively. The diameter E of the hole through the blank is slightly less than the outer diameter F of the blank 6 for the inner ring 1.

Figure 4:
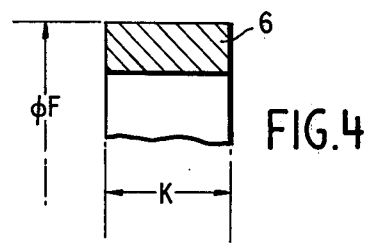

The blank 6, shown in FIG. 4, made of bearing steel of type 100 c6 can likewise be formed by turning or punching or by rolling strips into rings and welding them together. The width K of the blank 6 is slightly less than the width C of the blank 5 for the outer ring 2. On the other hand, its outer diameter F is slightly greater than the diameter E of the hole in the blank 5.

Figure 5:
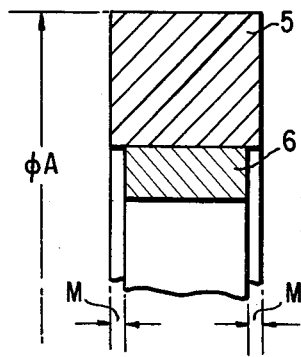
FIG. 5 is a section of the set of two rings assembled in the press.

The two blanks 5 and 6 are then mated in the press, one inside the other as shown in FIG. 5, and the faces of the inner blank 6 are at equal distances from those of the outer blank 5. The dimensional proportions between the two blanks 5 and 6 are chosen so as to make the sum of their weights equal to that of the composite race.

Figure 7:
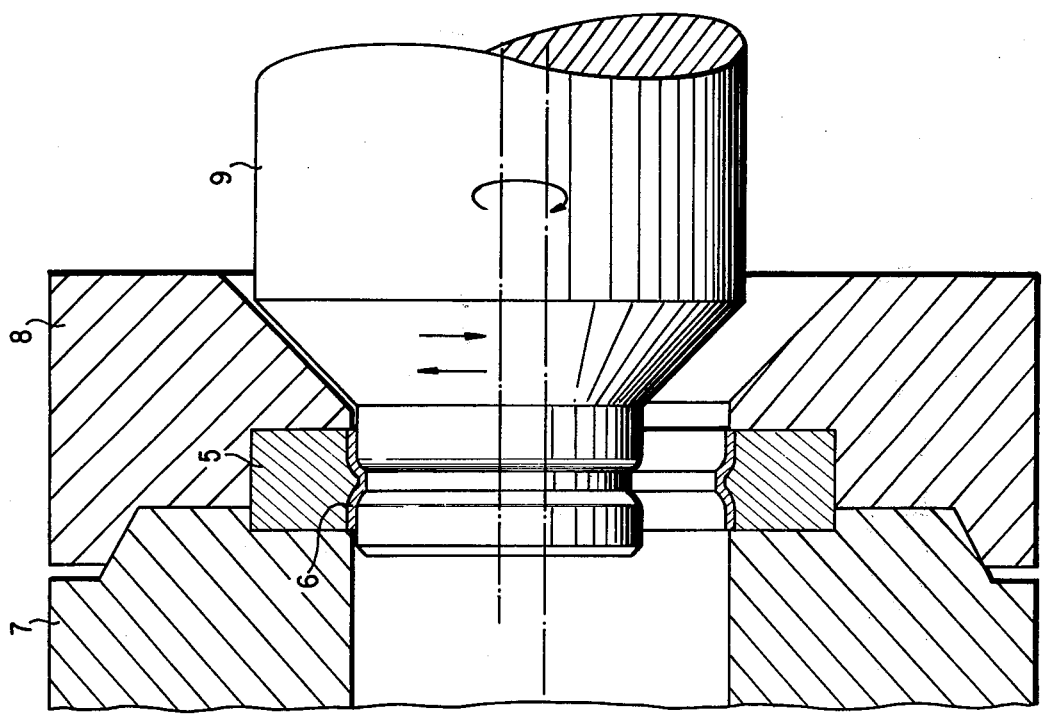
FIGS. 6 and 7 are schematic representations of the arrangement for rolling the rings shown in FIG. 5 in the course of two phases of machining.
Figure 6:
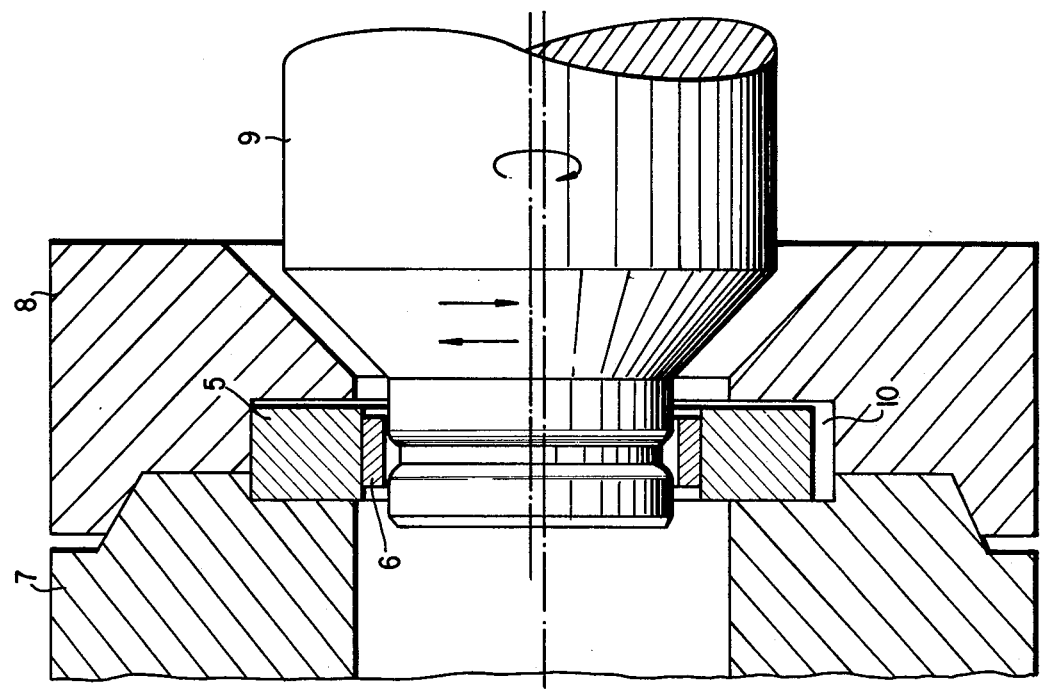

The two blanks, assembled concentrically, then form a unit which is to be deformed radially. The rolling operation as shown in FIGS. 6 and 7 is performed while the outer blank 5 is confined in a support made up of two separable shells 7 and 8, the inner dimensions of which are equal to the outer diameter B and the thickness D of the race being made. A suitably shaped roller 9 of profile corresponding to that of the ball grooves is driven in rotation and in translation towards the blank 6. In the course of the rolling process the blanks 5 and 6, under the action of the pressure exerted by the roller 9, deform axially and radially until they completely fill a cavity 10 in the support bounded by the separable shells 7 and 8. The outer ring member is rapidly cooled by thermal conductivity through the holder of the ring members which is itself cooled by either a water jacket or the use of a cold oil spray during the feeding stage of the rolling process.

At the end of this operation the profile of the ball groove of ring 1 obtained starting with the blank 6 is embedded in the ring 2 obtained from the blank 5. The rotation and translation of the rollers 9, in this way, confer on the blank 6 an inner profile corresponding to that of the ball grooves.

After rolling, the race is subjected to a hardening and tempering heat treatment identical to that used for steels of the 100 c6 type described hereinabove. Each of the rings making up the race undergo changes in dimension during these operations. The magnitude of these dimensional variations, due to the presence of carbide in solution in the hardened martensitic matrix, is different for each of the steels of the rings.

Judicious choice of the heat treatment conditions permits limiting the application of constraints to the rings not having ball grooves. Perfect cohesion between the two rings, radial as well as angular, is realized in this manner.

A particularly interesting application of the invention concerns the fabrication of outer bearing races with two rows of balls in oblique contact for front automobile wheels, an example of the mounting of which is illustrated in FIG. 8. In this example the outer race 21 of the bearing made up of the rings 1 and 2 is associated with an inner race consisting of two semi-races 24. Also provided is a motor shaft end with a cylindrical part fitting in a splined hub 22 which carries a drive flange 23 for the vehicle wheel and the two inner semi-races 24 of the bearing. The wheel, not shown, is mounted by means of the usual threaded bolts through the tapped holes 25 of the flange 23. The outer ring serves as the support for the bearing and is mounted as shown in the drawing with its flat face 26 attached, butted against and centered by the outer surface 27 in a suitable channel machined in a fixed supporting part 28 connected to the vehicle chassis by the suspension and pivotable about an axis as in the case of a front-vehicle for instance. In this case the motor shaft is integral with a piece constituting or enclosing the universal joint or transmission coupling engaging the splined boring of hub 22.

It is to be noted that the outer ring 2 of the race of the bearing permits machining of the portions intended for attaching the assembled bearing to the suspension by the usual techniques used for machining soft and annealed steels, to thus suppress the influence of dimensional varations due to the heat treatment.

Obviously many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a composite bearing race including an inner and outer ring comprising:
   concentrically positioning said inner and outer ring in holder;
   deformably assembling said inner and outer ring member by rolling a first at least one ball groove in said inner ring member and deforming said outer ring member such that a second at least one ball groove is radially embedded in said outer ring member; and,
   heat treating said deformably assembled inner and outer ring members such that one of said inner member increases more in volume than said outer ring member to provide radial and annular cohesion therebetween wherein said inner ring member comprises 52100 steel in accordance with SAE specification J404 and comprises in weight percent C 0.95 to 1.10—Cr 1.50 to 1.60—Ni$\leq$0.30—Mn 0.25 to 0.40—Si 0.10 to 0.35—P+S$\leq$0.025—remainder: Fe and wherein said outer ring member comprises a low alloyed steel or a plain carbon steel for which the major selective factor is that carbon content thereof is less than 0.40 in weight percent.

2. The method of manufacturing a composite bearing race as set forth in claim 1 wherein,
   said one of said inner and outer ring members comprises said inner ring member and said other of said inner and outer ring members comprises said outer ring member.

3. A method of manufacturing a composite bearing race comprising:

concentrically disposing an inner and outer ring member in a holder;

heat treating said concentrically disposed inner and outer ring members to a temperature above 850° C.

rolling said inner and outer ring members and deforming said outer ring member so as to form a ball groove in said inner ring member during said rolling steps;

rapidly cooling said outer ring member by thermal conductivity through said holder; and, heat treating said deformably assembled inner and outer ring members such that said inner ring member increases more in volume than said outer ring member to provide radial and annular cohesion therebetween wherein said inner ring member comprises 52100 steel in accordance with SAE specification J404 and comprises in weight percent C 0.95 to 1.10—Cr 1.50 to 1.60—Ni≦0.30—Mn 0.25 to 0.40—Si 0.10 to 0.35—P+S≦0.025—remainder: Fe and wherein said outer ring member comprises a low alloyed steel or plain carbon steel.

4. A method of manufacturing a composite bearing race including an inner and outer ring member comprising:

concentrically positioning a first and second blank in a press;

mating said first and second blank so as to form said inner and outer ring members;

rolling said inner ring member and deforming said outer ring member so as to form a first at least one ball groove in said inner ring member such that a second at least one ball groove is radially embedded in said outer ring member; and, heat treating said deformably assembled inner and outer ring members such that said inner ring member increases in volume more than said outer ring member to provide radial and annular cohesion therebetween wherein said inner ring member comprises 52100 steel in accordance with SAE specification J404 and comprises in weight percent C 0.95 to 1.10—Cr 1.50 to 1.60—Ni≦0.30—Mn 0.25 to 0.40—Si 0.10 to 0.35—P+S≦0.025—remainder: Fe and wherein said outer member comprises a low alloyed steel or plain carbon steel.

5. The method of manufacturing a composite bearing race as set forth in claim 4 further comprising forming said second blank such that the width of said second blank is less than that of said first blank prior to said step of mating said first and second blank in a press.

6. The method of manufacturing a composite bearing race as set forth in claim 4 wherein said step of rolling said first at least one ball groove in said inner ring member comprises rolling a first plurality of ball grooves in said inner ring member such that a second plurality of ball grooves are radially embedded in said outer ring member.

7. The method of manufacturing a composite bearing race as set forth in claim 4 wherein said heat treating comprises heat treating said deformably assembled inner and outer ring members to a temperature above 850° C.

8. The method of manufacturing a composite bearing race as set forth in claim 7 which further comprises rapidly cooling said outer ring member during said rolling step.

* * * * *